Patented Oct. 31, 1944

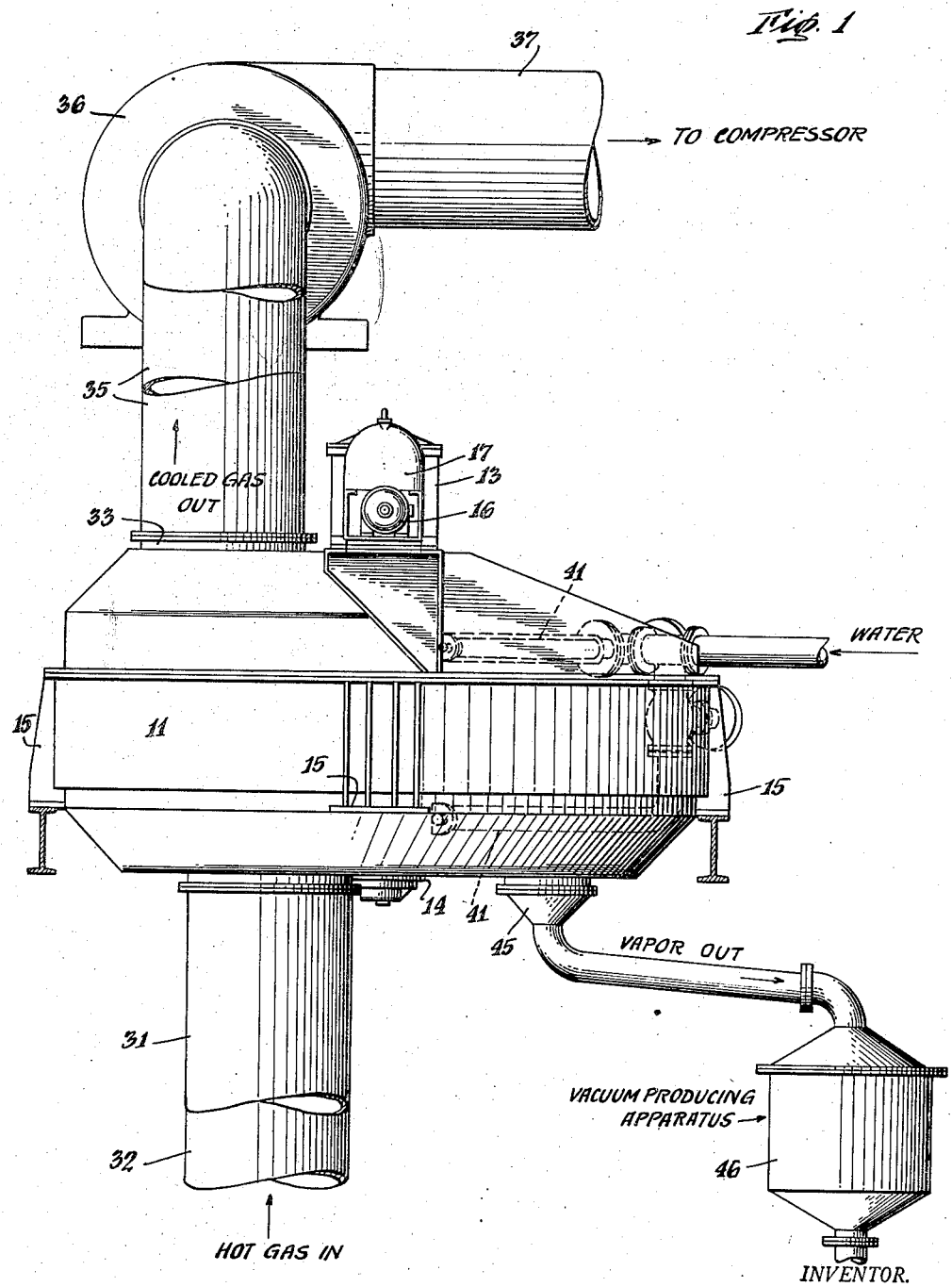

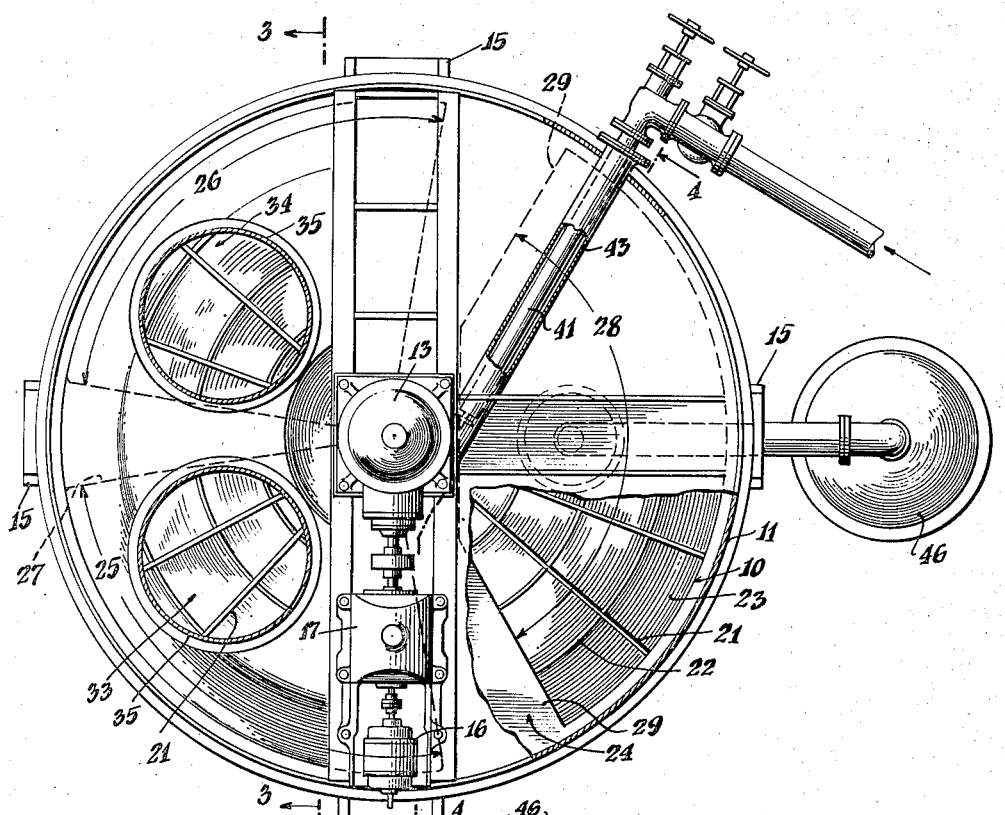
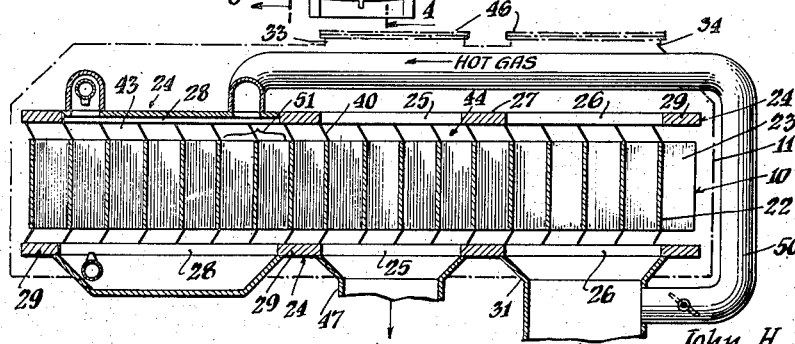

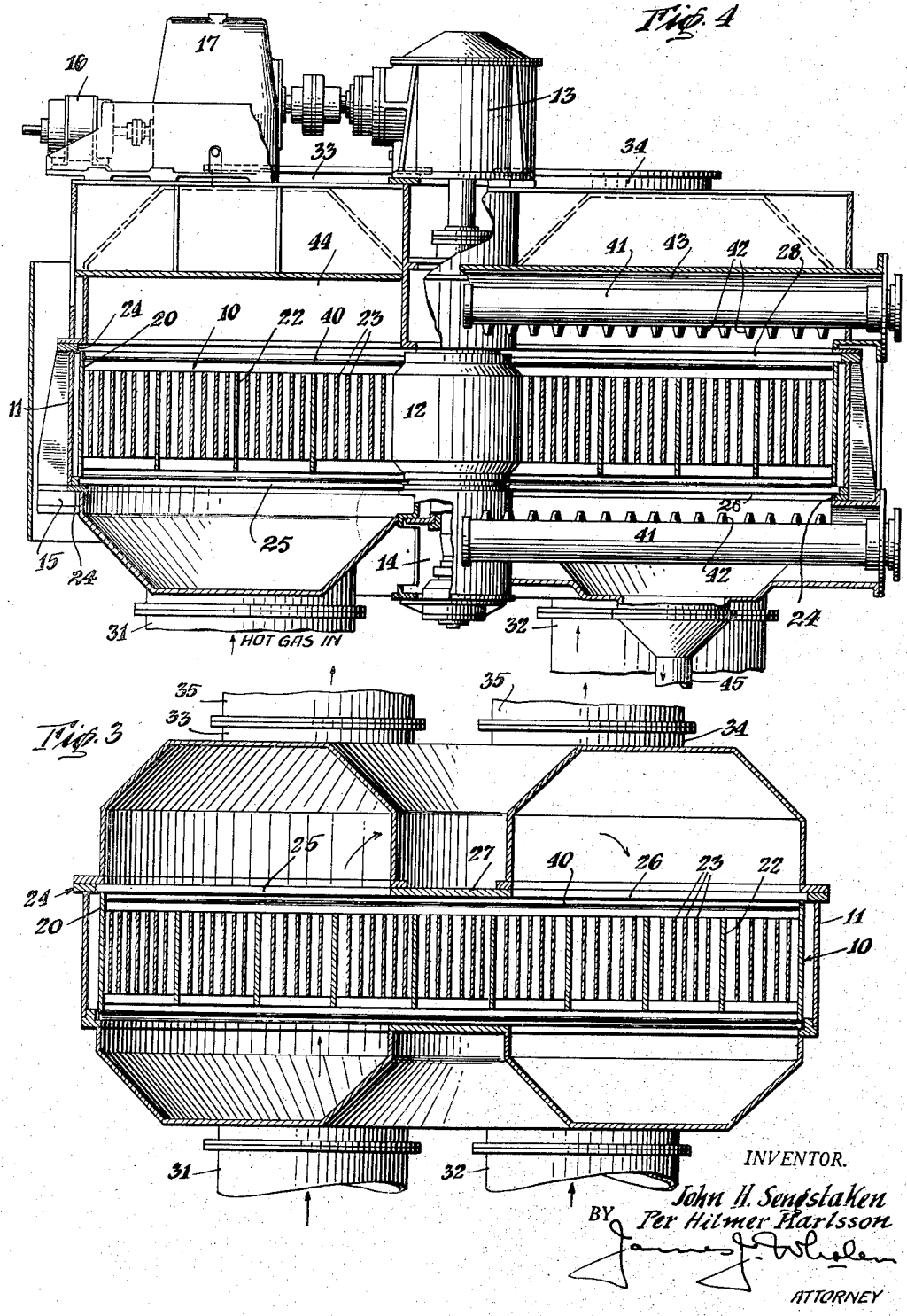

2,361,692

UNITED STATES PATENT OFFICE 2,361,692

FLUID TREATING APPARATUS

Per Hilmer Karlsson, Wellsville, and John H. Sengstaken, Plandome, N. Y., assignors to The Air Preheater Corporation, New York, N. Y.

Application May 28, 1943, Serial No. 488,822

5 Claims. (Cl. 62—139)

This invention relates to fluid treating apparatus particularly adapted for use as heat exchanger apparatus to cool gases by passing them over surfaces absorbing the heat therefrom.

In carrying out the invention the gases to be cooled are passed over metallic plates or other suitable material which, after absorbing heat from the gases, are moved out of the gas stream and caused to give up their heat before being returned to the gas stream to again absorb heat. A feature of the improved apparatus of the invention is that the plates that have absorbed heat from the gases are wetted by water or other liquid while positioned in a chamber in which a sub-atmospheric pressure is maintained so as to cause a more rapid evaporation of the wetting fluid and consequent quicker and more efficient cooling of the plates.

The invention will be best understood upon consideration of the following detailed description of an illustrative embodiment thereof when read in conjunction with the accompanying drawings in which:

Figure 1 is a diagrammatic elevational view of gas-cooling apparatus embodying the present invention;

Figure 2 is a plan view of the gas cooler illustrated in Figure 1;

Figure 3 is a vertical sectional view on the line 3—3 in Figure 2 showing the gas passage of the cooling apparatus;

Figure 4 is a vertical sectional view on the line 4—4 in Figure 2 and shows the water spraying devices in the plate cooling chamber of the apparatus; and Figure 5 is a developed view, in section, of the rotor and adjacent parts and further shows a duct connecting the gas inlet conduit of the apparatus with the plate cooling chamber.

The apparatus comprises a cylindrical rotor designated as a whole by the numeral 10 (Fig. 3) rotatable within a generally cylindrical housing 11 and having its axis or rotor post 12 journalled in upper and lower bearings 13 and 14, respectively, carried by the housing which in turn is supported on structural steel work (not shown) by means of supporting feet or brackets 15. The rotor 10 is turned slowly within the casing 11 by a motor 16 operating through reduction gearing 17 and suitable bevel gearing within the housing for the upper bearing 13.

The rotor 10 consists of a cylindrical shell 20 interiorly subdivided into a plurality of wedge or sector shaped compartments by radial partitions 21 which also serve to connect the shell 20 with the rotor post 12. Circumferential diaphragms 22 concentrically mounted in the rotor subdivide the compartments into a series of radially spaced sections; each section containing a plurality of metallic plates 23 spaced apart to provide vertical passages therebetween for the flow of fluids. Within the housing 11 opposite and covering each end of the rotor 10 is a sector plate 24 each formed on the left hand or gas side of the apparatus with openings 25, 26 separated by an imperforate part 27, with the openings in the upper and lower sector plates alined so that gas may flow freely to and from the passages of the rotor as the latter passes therebetween. As shown, a pair of gas inlet conduits 31, 32 are connected to the bottom of housing 11 in alinement with the openings 25, 26 in the lower sector plate while a pair of outlet openings 33 and 34 are provided from the top end of the housing. In Fig. 1 the gas outlets 33, 34 are connected with ducts 35 which merge into a common connection to a fan 36 which draws the gas through the apparatus and supplies them through a duct 37 to a gas compressor, not shown.

On the right hand or cooling chamber side of the apparatus the sector plates 24 have a single opening 28. The imperforate portions 29 of the sector plates that separate this opening 28 from the openings 25, 26 on the gas side of the apparatus are at least equal in arcuate extent to the maximum arcuate dimension of each of the compartments formed by the radial partition plates 21 in the rotor so that at least one radial sealing member 40 mounted on these partitions may wipe at all times against the opposing surfaces of the sector plate to prevent gas leaking from the gas passage into the cooling chamber. Located within the cooling chamber above and below the rotor are a pair of radially extending spray pipes 41 having a plurality of outlet nozzles 42 directed to spray water or other cooling liquid on the plates 23 contained in the rotor compartments as they pass therebeneath. The spray pipes are located within the cooling chamber 43 on the side thereof at which the compartments of the rotor first enter it after having left the gas passage 44 in clockwise rotation of the rotor. In order that the water sprayed upon the plates may be rapidly evaporated to cool them quickly, a vacuum or sub-atmospheric pressure is maintained in the cooling chamber by providing an outlet connection 45 at its bottom through which the water vapor may be drawn off by barometric condenser 46 or other suitable form of vacuum producing apparatus.

In the arrangement shown in Figure 5, the gas outlets 33, 34 at the top end of the housing 11 are closed off by cover plates 46 and the gases enter through the conduit 31 and are drawn off through the conduit 47, both of which are connected to the bottom of the housing. The entering gas flows upwardly through the parts of the rotor alined with the opening 26 in the upper sector plate across the top of the rotor and thence downwardly by way of the opening 25 in the upper sector plate and through the rotor to the outlet duct 47. The up and down-flowing streams of gases are maintained separated by the radial seal strips 40 wiping on the imperforate portion 27 of the sector plate that separates the openings 25 and 26 which thus prevent commingling of the two streams of gases. In this arrangement a duct 50 connecting with the gas inlet conduit 31 discharges into the cooling chamber 43 of the apparatus at a point 51 near the far edge of the opening 26 in the top sector plate 24 so that the plates in rotor compartments about to leave the cooling chamber and pass to the gas passage 44 are first contacted by a stream of hot gases so as to assure that the plates 23 are dry at the time they re-enter the gas passage of the apparatus.

The gas cooler described above operates on the continuous regenerative principle, such as exemplified by the Ljungstrom type air preheater as described in Patent No. 1,652,025, issued December 6, 1927. Each revolution of the slowly moving rotor 10 containing the cooling surface 23 produces a complete cycle of exchange in which heat from the hot gas, such as butane or butadiene gas, is constantly absorbed by the cooling surface 23 and then given up as it moves through the cooling chamber 43 where a fine spray of water or other vaporizable liquid cools the plates.

The amount of water sprayed on the plates for cooling purposes is only the amount that may be effectively evaporated so as to assure that the plates are dry upon entering the gas zone. The cooling action of the unit is accelerated by connecting the cooling chamber to the barometric condenser 46 or other vacuum producing apparatus. With a pressure of say one and a half pounds absolute maintained in the cooling chamber 43 the boiling point of the water is low so that the latent heat of vaporization is utilized in cooling the plates 23. The cooling chamber is of such arcuate extent the further part of it in the direction of rotation functions as a drying section where excess water drains off the plates; the complete drying of the latter is assured by directing some of the gases at their hottest temperature via duct 50 into the part 51 of cooling chamber 43 from which the plates move again directly into the gas passage. The drying gas is passed over to the water side in controlled quantities so that the moisture is dried but the cooled surface is not heated up sufficiently to destroy the heat cycle of the unit. The gas passage 44 of the apparatus is preferably maintained under a slightly lower vacuum than in the cooling chamber 43 so that any leakage past the radial seals 40 will be from the gas passage to the water vapor side or cooling chamber with the result that the apparatus does not cause undesirable entrainment of water in the gases passing therethrough to be cooled.

It will be appreciated that the unit is suitably sealed from the outside atmosphere so that no air can enter and mix with the gas; such seals have not been shown or described herein since it is believed apparent how suitable seals may be provided once the necessity therefor is pointed out.

While the apparatus disclosed herein has been particularly described in its aspect as gas cooler, it may readily be employed for treating one fluid with another as well as for cooling purposes. For example, a treating fluid whether gaseous or liquid may be brought into contact with the rotor or material carried therein so that as the rotor turns this treating fluid is brought into contact with a fluid passing through what has been referred to as a gas passage for the purpose of treating or modifying the latter fluid in one way or another.

Although a specific embodiment of the invention has been illustrated in the drawings and described in detail herein it is to be understood that many changes and variations may be made without departing from the invention as defined in the appended claims.

What we claim is:

1. Apparatus of the type described comprising a rotor formed with fluid passages therethrough; a housing enclosing said rotor formed at one side with a passage through which a fluid may be continuously passed to contact the rotor and with a chamber separated from said passage into which the rotor turns; means disposed in said chamber to bring a second treating fluid into contact with said rotor; and means for turning said rotor to continuously move portions thereof through said passage to be contacted by said first mentioned fluid therein, into and through said chamber to be contacted by said second treating fluid and back into said passage to again be contacted by the first fluid therein.

2. Gas cooling apparatus comprising a rotor carrying heat absorbing material; housing enclosing said rotor formed at one side with a passage through which a gas may be continuously passed to contact the heat absorbing material carried by the rotor and with a chamber separated from said passage into which the heat absorbing material is then moved as the rotor turns; means disposed in said chamber to spray a cooling liquid on all the heated material in said rotor during each rotation thereof; and means associated with said chamber for producing a vacuum in said chamber to cause the liquid sprayed upon said material to be vaporized at a temperature below the boiling point of said liquid at atmospheric pressure.

3. Gas cooling apparatus comprising a rotor carrying heat absorbing material; housing enclosing said rotor formed at one side with a passage through which a gas may be continuously passed to contact the heat absorbing material carried by the rotor and with a chamber separated from said passage into which the heat absorbing material is then moved as the rotor turns; means disposed in said chamber to spray a cooling liquid on the heated material in said rotor; means associated with said chamber for producing a vacuum in said chamber to cause the liquid sprayed upon said material to be vaporized at a temperature below the boiling point of said liquid at atmospheric pressure; means for turning said rotor to continuously move portions thereof that carry heat absorbing material through said gas passage to absorb heat into and through said chamber to be cooled and back into said gas passage to again absorb heat; a conduit for supplying hot gas to said gas passage; and a duct connected to said conduit and opening into said chamber adjacent the point where heat absorbing material carried in the rotor is about to move out of said chamber on its way to said gas passage as the rotor turns.

4. Gas cooling apparatus comprising a rotor carrying heat absorbing material; housing enclosing said rotor formed at one side with a passage through which a gas may be continuously passed to contact the heat absorbing material carried by the rotor and with a chamber separated from said passage into which the heat absorbing material is then moved as the rotor turns; means disposed in said chamber to spray a cooling liquid on the heated material in said rotor; means associated with said chamber for producing a vacuum in said chamber to cause the liquid sprayed upon said material to be vaporized at a temperature below the boiling point of said liquid at atmospheric pressure; means for turning said rotor to continuously move portions thereof that carry heat absorbing material through said gas passage to absorb heat into and through said chamber to be cooled and back into said gas passage to again absorb heat; a conduit for supplying hot gas to said gas passage; means for supplying heated gas to said chamber adjacent the point where heat absorbing material carried in a rotor is about to move out of said chamber on its way to said gas passage as the rotor turns for drying said material prior to its return to said passage.

5. The method of cooling a heated gas comprising; continuously moving parts of a mass of heat absorbing material into and out of a stream of heated gas to absorb heat therefrom and spraying a liquid on parts of said heated material when positioned out of the stream of gas, and maintaining a sub-atmospheric pressure in the region of said material for causing the liquid to vaporize at a temperature below its vaporization temperature at atmospheric pressure.

PER HILMER KARLSSON.
JOHN H. SENGSTAKEN.